July 31, 1973 V. STINGELIN 3,749,563
INSTALLATION FOR MAKING SHEET GLASS
Filed March 22, 1971

Valentin STINGELIN
INVENTOR

BY Karl J. Ross
Attorney

United States Patent Office 3,749,563
Patented July 31, 1973

3,749,563
INSTALLATION FOR MAKING SHEET GLASS
Valentin Stingelin, Aire, Geneva, Switzerland, assignor to Battelle Memorial Institute, Carouge, Geneva, Switzerland
Filed Mar. 22, 1971, Ser. No. 126,789
Claims priority, application Switzerland, Mar. 24, 1970, 4,459/70
Int. Cl. C03b 17/00, 18/00
U.S. Cl. 65—182 R
10 Claims

ABSTRACT OF THE DISCLOSURE

An installation for making sheet glass comprises a fluidic support onto which molten glass is spread to form a layer, a plate located above the support, spaced from the layer of glass thereon, and guide means for forming along the plate edges an inwardly and downwardly converging peripheral air curtain which serves to build up a pressurized air mattress between the plate and the layer. The compressive action of this mattress serves to reduce the thickness of the glass sheet to less than the equilibrium thickness that would otherwise be obtained.

---

The present invention relates to an installation for manufacturing sheet glass of different thickness, including thin sheets of about three to four millimeters or less, of perfect planeness and evenness.

There is known a method of manufacture called the float process according to which sheet glass is produced by pouring a mass of molten glass onto a bath of a liquid of higher density, specifically molten tin, this mass being left to spread naturally over the bath and progressively reaching a so-called equilibrium thickness of about 6.3 mm. The production of sheets of glass of lesser thickness can be achieved only by performing a subsequent drawing treatment on sheets initially having a thickness of 6.3 mm. and the thinner the sheet it is desired to produce the longer and more complex the drawing treatment will be.

According to a proposed variant of this method, the bath of molten tin that acts as a support for the mass of glass pouring out of the furnace is replaced by an air mattress or cushion. In such an event, the equilibrium thickness of the sheets of glass that can be produced is about the same as with the float process.

Attempts have also been made to reduce this set thickness by a crushing action on the mass of molten glass, such action being produced by pressure exerted by two antagonistic air mattresses between which the mass is made to move while being shaped.

In a known system for carrying out this method, the air under pressure used to form the mattresses is discharged through a particularly large number of modular chambers (of the order of 1500 per m.²), the air of each mattress being continuously sucked out through appropriate outlet openings located within the immediate proximity of each modular chamber.

In another known system, the two antagonistic mattresses are formed by resorting to plates, placed opposite each other, between which is fed the molten glass to be shaped, each plate being provided over its entire area with a plurality of throughgoing passages that are connected to a common source of compressed air via valves which serve to regulate the pressure of the air circulating in each passage and intended to form the air mattress of each plate. In this system, the escape of the air from these mattresses is achieved exclusively through free flow between the plates and the glass towards the edges of the plates.

To the best of my knowledge, there is at present no air-mattress system in actual operation because in practice it has proved to be practically impossible to produce sheets of glass that are perfectly flat.

An object of the invention is to create an installation for manufacturing sheet glass which enables the thickness of the glass sheet that is produced, whether by the float process or by spreading over a gaseous support, to be set at a desired value, less than the equilibrium value, directly while the sheet is being formed.

To this end I provide, in a system according to the invention, casting means for pouring onto a fluidic support (such as a metal bath or a gas cushion) a mass of molten glass from a suitable source to produce, through spreading of the mass, a layer of molten glass covering all or part of the support, apparatus for forming a gaseous mattress under pressure above at least a portion of the support surface and means for driving the layer of glass over that surface in a direction tending to move it away from the pouring zone, as the layer comes to be formed, and to pass at least a portion of this layer past the mattress-forming apparatus to subject that portion to the action of the pressure of the gaseous mattress for a length of time sufficient, with a given flow rate and pressure of the gaseous fluid forming the mattress, to reduce the thickness of the glass layer to the desired extent. The mattress-forming apparatus comprises a plate extending above the operative surface area of the fluidic support and means for forming a continuous peripheral curtain or screen of gaseous fluid, around the space separating the flat underside of the plate from the support. This peripheral gas curtain, flowing from the edges of the plate downwardly toward the support, confines a volume of gas in that space with a pressure head exceeding the ambient pressure by virtue of the dynamic action resulting from an inwardly directed pressure component of the gaseous flow forming the curtain, this component may be intensified by a downward convergence of that flow as it descends around the plate edge. The descent of the jet is controlled by peripheral guide means such as the rim of a hollow cover or hood forming a plenum chamber above the plate.

The accompanying drawings illustrates by way of example and very diagrammatically an embodiment of the invention. In the drawing.

Figure 1:
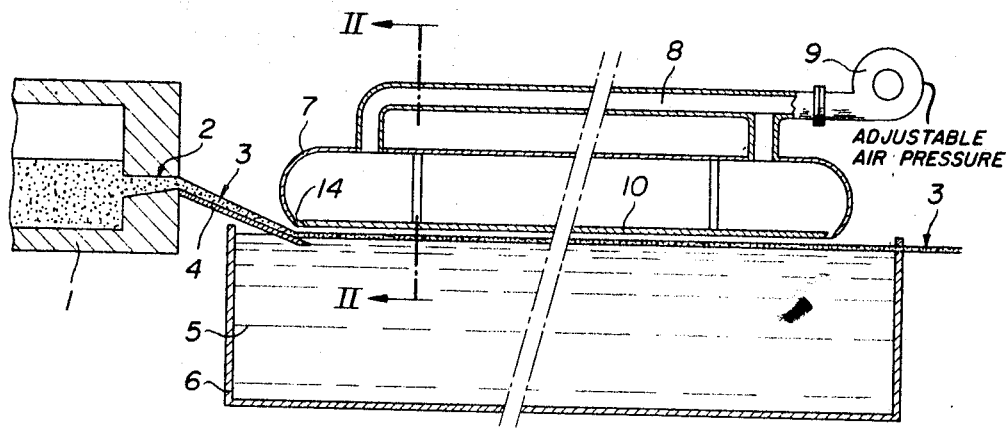
FIG. 1 is a longitudinal section of a system according to my invention.

The installation illustrated in FIG. 1 comprises a glass-melting furnace 1 having an opening 2 for discharging a mass of molten glass 3 over a ramp 4 which feeds the mass to the upstream end of a bath 5 of molten tin contained in a trough 6. The walls of the trough are heated by gas or oil burners or by electric heating elements, not shown, to a relatively high temperature, of the order of 1200° C.

The described installation basically corresponds to that used for carrying out the conventional float process in which a mass of molten glass is poured onto a bath of molten tin and left to spread naturally over the bath, this mass of molten glass forming over the bath a perfectly flat glass sheet having a thickness of about 6.3 mm. This thickness is mainly determined by the specific weight of glass, its surface tension and the earth's gravity acceleration.

As the glass sheet comes to form on the bath of molten tin, it is removed from the bath at the end thereof remote from that at which the glass mass to be formed is poured onto the bath.

In the illustrated installation, the bath of molten tin is also intended to play the part of a plane support for the glass, during the forming stage, but the thickness of the sheet of glass that is produced can have practically any value, below the above-mentioned equilibrium value.

To this end, the installation comprises a hollow cover or hood 7 which is located above the trough 6 and which extends practically over the entire area of the tin bath 5, the interior of this hollow cover forming a plenum chamber connected by conduits 8 to a source of gaseous fluid under pressure, e.g. air, diagrammatically represented by a centrifugal blower 9.

The gaseous fluid preferably, but not indispensably, has a temperature such that if this fluid were brought into contact with glass that is floating on the tin bath 5, the glass would no be subjected to excessive heat stresses.

In the bottom opening of the hollow cover 7 there is arranged, with all-around clearance, a plate 10 extending horizontally over the tin bath 5.

Figure 3:
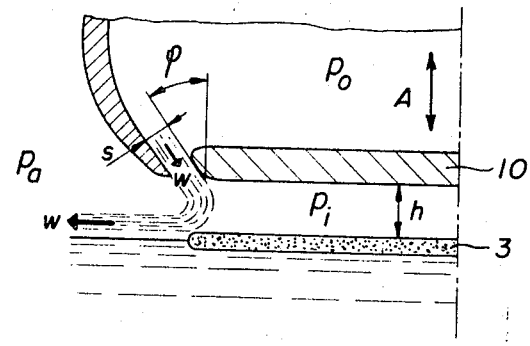
FIG. 3 shows on an enlarged scale a detail of FIG. 2.

As will be observed from FIG. 3, the edge of the solid structure constituted by the plate 10 is so cut as to form a chamfer having an angle of inclination in relation to a vertical plane, the portion of the hollow cover surrounding this edge extending parallel to the chamfer of the plate 10, at a distance S therefrom.

If $p_o$, $p_i$ and $p_a$ are respectively the value of the pressure prevailing inside the hollow cover 7, the value of the pressure that comes to be set up between the plate 10 and the sheet of glass 3 whose thickness is to be controlled, and the value of the pressure prevailing outside the hollow cover (ambient pressure), If $w$ is the flow speed of the gaseous fluid introduced into the space between the flat underside of plate 10 and the sheet 3 from the source 9, as it passes through the peripheral gap 14 of width S defined by the plate 10 and the hollow cover 7, over the entire circumference of these members, If $\rho$ is the specific weight of this gaseous fluid, If $h$ is the distance between the plate 10 and the sheet of glass 3, And finally, if it is supposed that the jet of gaseous fluid, that issues from the plenum chamber at angle $\varphi$ toward the tin bath 5 does not enter the space of height $h$ bounded by the plate 10 and is simply deflected outwardly along a substantially horizontal path with maintenance of a substantially constant cross-section of the jet of gas whereby the initial mean speed $w$ of the jet remains unchanged and the jet is not subjected to any pressure drop despite the deflection which it undergoes, then the internal pressure $p_i$ is greater than the external pressure $p_a$ by an amount equal to $$\Delta_p = p_i - p_a = \rho \frac{w^2}{2} \cdot 2 \cdot (1 + \sin \varphi) \cdot \frac{S}{h}.$$

From the above relationship, it will be observed that the value of $\Delta_p$ is least when the angle $\varphi$ is equal to 0, amounting to $$\Delta_p = \rho \frac{w^2}{2} \cdot 2 \cdot \frac{S}{h},$$

and is greatest when $\varphi = 90°$, $\Delta_p$ then amounting to $$\Delta_p = \rho \frac{w^2}{2} \cdot 4 \cdot \frac{S}{h}.$$

Figure 2:
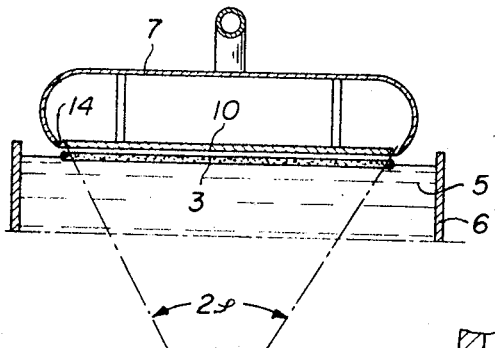
FIG. 2 is a cross-section along line II—II of FIG. 1.

In practice, purely constructive considerations lead to the adoption of an angle $\varphi$ of less than 90°, for instance of the order of 45° to 70°. The downward convergence of the air curtain, with a vortex angle of 2, has been indicated in FIG. 2.

It will thus be appreciated from the above that, whenever the hollow cover 7 is supplied with gaseous fluid in the manner indicated through the gap between the hollow cover and the plate, the pressure head of the mass of air lying between this plate and the sheet of glass to be formed, which at first is equal to the atmospheric pressure, increases by a value $\Delta_p$ which is directly dependent on the square of the flow speed $w$.

Now, as soon as a sheet of molten glass is subjected on its topside to the action of a superatmosphere pressure, everything happens as if the glass were subjected to a corresponding increase in its specific weight. This causes a change in the conditions of equilibrium in the glass mass leading to a decrease in the thickness of the sheet in relation to the normal equilibrium thickness of 6.3 mm., this being the thickness that is obtained when the glass is simply left to itself on the bath of liquid tin.

For a given design of the described apparatus, it is possible to determine, for instance experimentally, the conditions under which the rate of flow and the supply pressure of the gaseous fluid fed into the hollow chamber 7 are to be selected in dependence on the desired thickness for the sheets of glass being manufactured. Of course, these conditions will differ according to the temperature or the specific weight of the gaseous fluid, or according to the quality of the glass to be treated, in particular according to its viscosity and according to the variation of this viscosity with temperature.

Because of the relatively high specific weight and of the perfect cohesion of the bath of molten tin, it is possible with the described installation to produce sheets of glass of practically constant thickness and of perfect planeness. These sheets of glass can even have a thickness of as little as about 1 to 2 mm.

Figure 4:
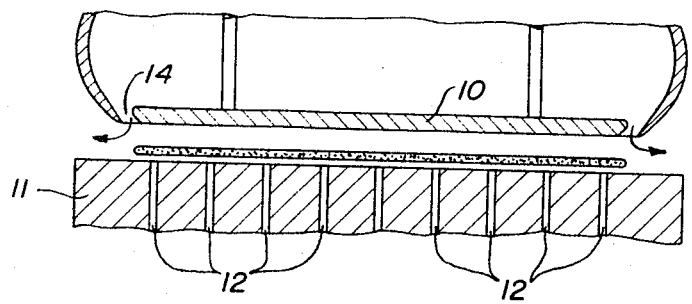
FIG. 4 illustrates in cross-section a modified constructional detail.

FIG. 4 illustrates a constructional modification of the installation according to the invention. The mass of glass 3 to be formed is deposited here not on a bath of molten tin but on a film of gaseous fluid, e.g. air, this film being formed on the top surface of a horizontal bed or base 11 through which extend a plurality of vertical channels 12 that are connected at their lower ends to a source of the film-forming fluid.

With this particular constructional form of the installation, the bed 11 need not necessarily be plane. For instance, the bed could have a convex cross-section, thus enabling the manufacture of glass sheets of lenticular cross-section. It would also be possible to envisage an installation in which the bed 11 has an undulated cross-section; the resulting sheets of glass would then have one side which is undulated and one side which is plane.

The invention is not limited to what has been illustrated or described: in particular, the air-curtain generator consisting of a hollow cover with a plate disposed in a bottom opening of the latter could be replaced by separate nozzles disposed over the entire length of the edges of the operative zone of the molten tin bath (FIG. 1) or of the perforated base which emits the sheet-supporting gas (FIG. 4), these nozzles being each supplied by an individual source of gaseous fluid under pressure or by a common source. The cross-section and the inclination of these nozzles would of course have to be determined in dependence on the aforestated relationship.

According to another feature of my invention which has been illustrated only diagrammatically by an arrow, (FIG. 3) the described installation could in addition comprise a mechanism for varying the vertical position of the plate 10 above the support for the sheets being formed so that, in so doing, the thickness of the sheets can be adjusted.

The described installation could also comprise means for regulating the pressure of the gaseous fluid supplied to the hollow cover, as indicated in FIG. 1, whereby the flow speed $w$ of this fluid and hence the thickness of the sheets to be produced can be acted upon directly.

Furthermore, the combination consisting of the hollow cover 7 and of the plate 10 could be made "floating" and be maintained above the bath of molten tin 5 or above the support-forming bed 11 for the gaseous film solely by the uplifting action of the air cushion, at pressure $p_i$, formed beneath the plate 10. In such an event, the hollow cover 7 could then be supplied with gaseous fluid either by a stationary supply source to which this cover is connected by a flexible conduit, or by a self-contained supply source, e.g. a blower powered by an electric motor and mounted on the hollow cover.

With a hood-and-plate assembly 7, 10 of given weight, the pressure $p_1$ will remain constant whatever may be the pressure $p_0$ of the gaseous fluid being fed into the hollow cover 7, it being understood that the distance between the plate 10 and the subjacent mass of glass will vary in the same direction as $p_0$.

By increasing the weight of the hollow cover, for instance by the addition of ballast suitably placed so that the 7, 10 should retain a balanced setting, it would be possible, with a given pressure $p_0$, to decrease the distance $h$ and hence to increase the pressure $p_1$ of the gaseous fluid acting on the mass of glass being shaped and consequently to bring about a corresponding reduction in the thickness of this mass.

I claim:
1. A system for producing sheet glass of a thickness less than normal equilibrium thickness, comprising:
    a fluidic support for a layer of molten glass;
    casting means for depositing said molten glass on a predetermined surface area of said support and advancing the resulting layer therealong;
    a solid structure with a flat underside spacedly overlying a portion of said surface with a separation sufficient to prevent physical contact between said structure and the layer to be deposited thereon;
    guide means forming around said structure a flow path for a peripheral gas stream; and
    a source for gaseous fluid under pressure discharging from above into said flow path for generating a peripheral gas curtain around said underside with a lateral inwardly directed pressure component, thereby building up an above-ambient pressure head in the space separating said underside from said surface area.
2. A system as defined in claim 1 wherein said gas curtain converges downwardly around said structure at the level of said underside.
3. A system as defined in claim 2 wherein said flow path includes an angle between substantially 45° and 70° with the vertical.
4. A system as defined in claim 1 wherein said structure comprises a horizontal plate bounding said space.
5. A system as defined in claim 4 wherein said source comprises a hood above said plate forming a plenum chamber, said hood having a bottom rim at the level of said plate defining with the edge thereof a continuous peripheral gap open to said plenum chamber.
6. A system as defined in claim 5 wherein said edge is chamfered to incline said jet at an acute angle inwardly toward said space.
7. A system as defined in claim 6 wherein said angle ranges between substantially 45° and 70° with reference to the vertical.
8. A system as defined in claim 5 wherein said source further comprises blower means working into said plenum chamber.
9. A system as defined in claim 8 wherein said blower means has an adjustable delivery pressure.
10. A system as defined in claim 1 wherein said structure is vertically movable with reference to said surface area for varying said pressure head.

References Cited
UNITED STATES PATENTS

| | | | |
|---|---|---|---|
| 3,468,650 | 9/1969 | Boaz | 65—182 R |
| 3,432,283 | 3/1969 | Galey | 65—99 A |
| 3,248,197 | 4/1966 | Michalik et al. | 65—182 R |
| 3,341,312 | 9/1967 | Wheeler et al. | 65—25 A |
| 3,342,573 | 9/1967 | Fredley et al. | 65—25 A |

ROBERT L. LINDSAY, JR., Primary Examiner

K. M. SCHOR, Assistant Examiner

U.S. Cl. X.R.
65—25 A, 91, 182 A

Dedication

3,749,563.—*Valentin Stingelin,* Aire, Geneva, Switzerland. INSTALLATION FOR MAKING SHEET GLASS. Patent dated July 31, 1973. Dedication filed Mar. 26, 1984, by the assignee, *Battelle Memorial Institute.*

Hereby dedicates to the People of the United States the entire remaining term of said patent.

[*Official Gazette June 12, 1984.*]